US011477803B2

(12) United States Patent
Akhtar et al.

(10) Patent No.: US 11,477,803 B2
(45) Date of Patent: Oct. 18, 2022

(54) ACCOMMODATING SIMULTANEOUS TRANSMISSIONS IN A WIRELESS CHANNEL

(71) Applicant: Arista Networks, Inc., Santa Clara, CA (US)

(72) Inventors: Nadeem Akhtar, Maharashtra (IN); Jatin Parekh, Mumbai (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 374 days.

(21) Appl. No.: 16/510,768

(22) Filed: Jul. 12, 2019

(65) Prior Publication Data
US 2021/0014873 A1    Jan. 14, 2021

(51) Int. Cl.
*H04W 4/00* (2018.01)
*H04W 72/12* (2009.01)
*H04W 72/04* (2009.01)
*H04W 74/08* (2009.01)
*H04L 5/00* (2006.01)
*H04W 52/36* (2009.01)

(52) U.S. Cl.
CPC ....... *H04W 72/1215* (2013.01); *H04L 5/0073* (2013.01); *H04W 52/367* (2013.01); *H04W 72/0473* (2013.01); *H04W 74/0808* (2013.01)

(58) Field of Classification Search
CPC .................................. H04W 72/1215
See application file for complete search history.

(56) References Cited

U.S. PATENT DOCUMENTS

| 8,442,016 | B1* | 5/2013 | Lee | H04W 16/14 370/338 |
| 8,493,897 | B2* | 7/2013 | Chang | H04W 72/1215 370/310 |
| 9,113,469 | B2* | 8/2015 | Choi | H04L 5/0053 |
| 10,834,678 | B1* | 11/2020 | Marupaduga | H04W 52/367 |

(Continued)

OTHER PUBLICATIONS

López-Pérez et al., "IEEE 802.11be—Extremely High Throughput: The Next Generation of Wi-Fi Technology Beyond 802.11ax," arXiv:1902.04320v1 [cs.IT] Feb. 12, 2019, 7 pages.

(Continued)

*Primary Examiner* — Guang W Li
(74) *Attorney, Agent, or Firm* — Fountainhead Law Group P.C.

(57) ABSTRACT

Systems and methods are disclosed for improving communication efficiency in environments featuring both 802.11ax devices and legacy devices. Although 802.11ax introduces the ability for multiple devices to transmit simultaneously over a wireless channel, this feature is not used to its full potential because legacy devices transmit using turn-based communication (waiting for the channel to free up before transmitting). To create the illusion that the channel is free, in one method, an 802.11ax access point lowers the power for 802.11ax transmissions in a portion of a wireless channel being utilized by the legacy device. In another method, the 802.11ax access point blanks the portion of the wireless channel altogether (i.e., does not schedule transmissions over the portion). As a result of these methods, signal interference is reduced, and legacy devices do not halt transmissions to follow turn-based communication.

25 Claims, 11 Drawing Sheets

(56) References Cited

U.S. PATENT DOCUMENTS

| | | | |
|---|---|---|---|
| 10,869,323 B2* | 12/2020 | Tsai | H04W 72/1215 |
| 10,880,840 B1* | 12/2020 | Mansour | H04W 52/367 |
| 2007/0280185 A1* | 12/2007 | McFarland | H03H 7/0153 |
| | | | 370/338 |
| 2008/0069063 A1* | 3/2008 | Li | H04W 88/06 |
| | | | 370/338 |
| 2016/0073429 A1* | 3/2016 | Oteri | H04W 74/0816 |
| | | | 370/338 |
| 2016/0173246 A1* | 6/2016 | Kenney | H04L 5/0044 |
| | | | 370/329 |
| 2016/0249303 A1* | 8/2016 | Kenney | H04W 24/08 |
| 2017/0135046 A1* | 5/2017 | Sutskover | H04W 52/343 |
| 2017/0353370 A1* | 12/2017 | Lee | H04W 52/343 |
| 2018/0062787 A1* | 3/2018 | Hsieh | H04L 1/0009 |
| 2018/0115952 A1* | 4/2018 | Shellhammer | H04W 64/003 |
| 2018/0184435 A1* | 6/2018 | Cariou | H04W 52/0203 |
| 2018/0242176 A1* | 8/2018 | Yang | H04W 52/54 |
| 2018/0317170 A1* | 11/2018 | Cariou | H04W 52/44 |
| 2018/0338286 A1* | 11/2018 | Hariharan | H04W 8/005 |
| 2019/0007130 A1* | 1/2019 | Fang | H04B 7/022 |
| 2019/0104482 A1* | 4/2019 | Wilhelmsson | H04W 52/242 |
| 2019/0356435 A1* | 11/2019 | Adachi | H04L 5/0007 |
| 2020/0120734 A1* | 4/2020 | Tsai | H04W 4/80 |
| 2020/0187127 A1* | 6/2020 | Mofidi | H04W 52/20 |
| 2020/0287633 A1* | 9/2020 | Silverman | H04B 1/38 |

OTHER PUBLICATIONS

3GPP Organizational Partners, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 v15.5.0 (Mar. 2019) 363 pages.

* cited by examiner

ACCOMMODATING SIMULTANEOUS TRANSMISSIONS IN A WIRELESS CHANNEL

BACKGROUND

The present disclosure is directed to resource unit management in a wireless channel, and more particularly to scheduling transmissions and adjusting transmission power over resource units to improve spectrum utilization.

SUMMARY

In some Wi-Fi specifications standards such as IEEE 802.11a/g/n/ac, multiple devices will not simultaneously transmit over a single wireless channel. A transmitting network device using a legacy standard will back off from transmitting upon detecting an ongoing transmission on the channel. This turn-based communication aims to reduce interference but inefficiently utilizes the spectrum and causes even slower performance in congested networks with a high volume of transmissions. IEEE 802.11ax (henceforth 802.11ax) divides channel bandwidth into portions referred to as resource units. By dividing a wireless channel into resource units and allocating different resource units for different network devices, 802.11ax overcomes the limits of turn-based communication because multiple transmissions can be scheduled simultaneously using orthogonal frequency-division multiple access (OFDMA) techniques.

802.11ax lacks cohesive spectrum utilization, however, in settings where 802.11ax devices operate alongside turn-based network devices such as legacy devices using Wi-Fi specifications standards preceding 802.11ax. In a simple network featuring an 802.11ax device and a legacy device occupying the same channel, for example, the legacy device will transmit only when the 802.11ax device is not transmitting in any resource unit and will halt transmissions when the 802.11ax device is transmitting. The 802.11ax benefit of simultaneous transmissions over the same channel is thus rendered inconsequential because the legacy device relies on the wireless channel being free.

A solution to the turn-based communication issue is adjusting the power of 802.11ax transmissions such that turn-based devices do not treat the 802.11ax transmissions as occupying the wireless channel. Some legacy devices employ, for example, carrier sense multiple access (CSMA) in which a transmitter detects the presence of a carrier signal and, in response, waits for an ongoing transmission to end before initiating its own transmission. More specifically, a transmitter is able to detect the carrier signal if the power of the signal exceeds a carrier sense threshold of the transmitter. By ensuring that the power of the 802.11ax transmission detected by such legacy devices is lower than the carrier sense threshold, such devices will continue to transmit over the wireless channel even when 802.11ax devices are transmitting. Additionally, 802.11ax devices can be configured such that they do not transmit using the resource units that correspond to the portion of a wireless channel occupied by a legacy device, focusing transmissions exclusively in resource units not occupied by legacy devices.

The techniques disclosed herein are not limited to embodiments employing turn-based devices. 802.11ax transmitters may also monitor for other 802.11ax transmissions to determine whether to back off. An 802.11ax transmitter may detect an 802.11ax transmission from a different transmitter occurring over a resource unit. In response, the 802.11ax transmitter adjusts the power level of its own transmissions over the resource unit such that the different transmitter does not detect the transmissions (e.g., the perceived power level at the different transmitter is below its carrier sense threshold). This allows for simultaneous transmissions over the resource unit.

Systems and methods for accommodating simultaneous 802.11ax and legacy transmissions in a wireless channel are thus described herein. In one embodiment, an access point generates a resource unit schedule that assigns a portion of a wireless channel to a client device. The portion of the wireless channel includes at least one resource unit. The access point wirelessly communicates with the client device via transmissions at a first power level and in accordance with a first wireless protocol (e.g., 802.11ax) over the portion. The access point may detect the transmission of a second wireless protocol signal in the portion of the wireless channel. In response to the detection, the access point determines a second power level for transmissions to the client device in the portion of the wireless channel.

For example, a first access point for an 802.11ax client device may determine that a second access point for a legacy client device is transmitting over the wireless channel that contains the resource unit that has been assigned to the 802.11ax client device. If the first access point continues transmitting, the second access point will halt its own transmissions instead of performing simultaneous transmissions. The first access point determines a second power level lower than the first power level, in order to prevent the halting of transmissions by the second access point.

The access point (e.g., the first access point of the previous example) accordingly modifies the resource unit schedule to assign the second power level to transmissions made by the access point when communicating with the client device in the portion of the wireless channel (i.e., the resource unit). In accordance with the resource unit schedule, when the access point transmits messages to the client device, the access point's transmissions are at the second power level in the portion of the wireless channel.

In some embodiments, the second wireless protocol is a legacy Wi-Fi specifications standard. The access point thus determines the carrier sense threshold of the legacy device from which the second wireless protocol signal originates and determines the pathloss between the access point and the legacy device. The access point subsequently adjusts the second power level to be less than the sum of the carrier sense threshold and the pathloss. This indicates that the power level of transmissions from the access point as perceived by the legacy device is less than the carrier sense threshold—thus insignificant for causing collisions. The legacy device will therefore continue to transmit data over the wireless channel. The access point may also transmit the pathloss and the carrier sense threshold of the access point to the legacy device in order for the legacy device to adjust the power level of the second wireless protocol signal to be less than the sum of the pathloss and the carrier sense threshold of the access point.

As the power level of transmissions is reduced by the access point over a certain resource unit, the access point may increase the power level of transmissions over a different resource unit. The total transmission power of all resource units of a wireless channel may be capped (e.g., the Federal Communications Commission (FCC) imposes an upper-bound on total transmission). As a result, the access point's adjustments in transmission power levels are such that the sum of the individual transmission powers, as specified in the resource unit schedule, is less than or equal to the total transmission power.

Simultaneous transmissions from 802.11ax devices and legacy devices can also be made possible by blanking transmissions in a portion of the wireless channel (e.g., a resource unit). In one embodiment, an access point allocates a wireless channel for communication in accordance with a first wireless protocol (e.g., 802.11ax). The wireless channel includes a plurality of resource units defined for assignment to a plurality of client devices communicating in accordance with the first wireless protocol. The access point determines that a transmission of signals is occurring in a first portion of the wireless channel. For example, an access point for an 802.11ax client device may detect transmissions from an access point for a legacy client device.

Based on the determination, the access point for the 802.11ax client device identifies a plurality of impacted resource units from the plurality of resource units (e.g., the resource units corresponding to portions of a wireless channel occupied by the transmission of signals). The access point generates a resource unit schedule that assigns the plurality of resource units to the plurality of client devices communicating in accordance with the first wireless protocol and specifically does not assign the plurality of impacted resource units to client devices for communication. By not assigning the plurality of impacted resource units, the portion of the wireless channel corresponding to the impacted resource units is effectively blanked (i.e., no transmissions are scheduled) and the detected transmission of signals is not halted (e.g., due to carrier sense mechanisms). All transmissions from the access point are subsequently sent to client devices using the assigned resource units. As previously discussed, the power level for transmissions over the assigned resource units may be increased because there is no transmission power allocated over the impacted resource units.

In one embodiment, the access point blanks transmissions over a resource unit based on detection of a radar signal. The access point detects a radar signal over a wireless channel utilized for transmissions by the access point. The wireless channel may be divided into a plurality of resource units. The access point identifies, from the plurality of resource units, a first resource unit that shares a frequency with the radar signal and amends a resource unit schedule to exclude the first resource unit from use for transmissions between the access point and client devices. The access point may also identify, from the plurality of resource units, a second resource unit that does not share the frequency with the radar signal. Accordingly, the access point amends the resource unit schedule to include the second resource unit for use for transmissions between the access point and the client devices.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Specific embodiments will now be described in detail with reference to the accompanying figures. In the following detailed description of these embodiments, numerous specific details are set forth in order to provide a more thorough understanding of the disclosure. However, it will be apparent to one of ordinary skill in the art and having the benefit of this disclosure that embodiments may be practiced without these specific details. In other instances, well-known features have not been described in detail to avoid unnecessarily complicating the description.

In the following description of FIGS. 1-11, any component described with regard to a figure, in various embodiments, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Figure 1:
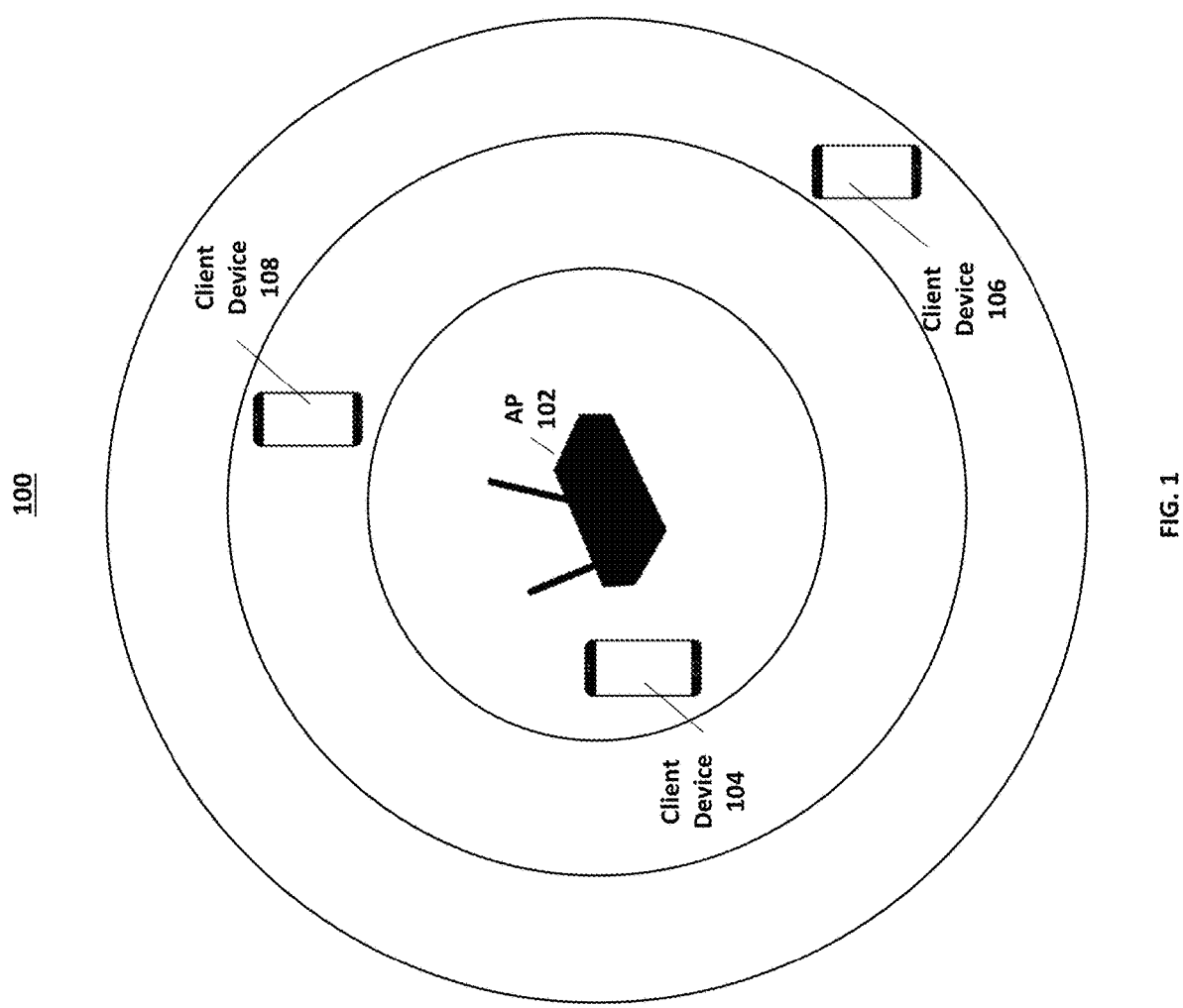
FIG. 1 shows an illustrative example of an access point communicating with multiple client devices over a wireless channel, in accordance with some embodiments of the disclosure.

FIG. 1 shows illustrative example 100 of an access point communicating with multiple client devices over a wireless channel, in accordance with some embodiments of the disclosure.

In example 100, access point (AP) 102 is serving client devices 104, 106, and 108 (e.g., Wi-Fi enabled devices such as smartphones, tablets, laptops, etc.). Client devices 104, 106, and 108 are placed in various locations away from AP 102 and are compatible with 802.11ax. The circles depicted in example 100 represent the range of AP 102's Wi-Fi coverage. Each circle has a radius that represents a distance from the access point (e.g., 25 meters). For example, the smallest circle may have a radius of 25 meters, the middle circle may have a radius of 50 meters, and the largest circle may have a radius of 75 meters. Based on signal attenuation, the largest circle represents the weakest signal strength, whereas the smallest circle represents the strongest signal strength. The placement of each client device can be estimated based on circle radius. For example, client device 106 is approximately 50-75 meters from access point 102.

Figure 2:
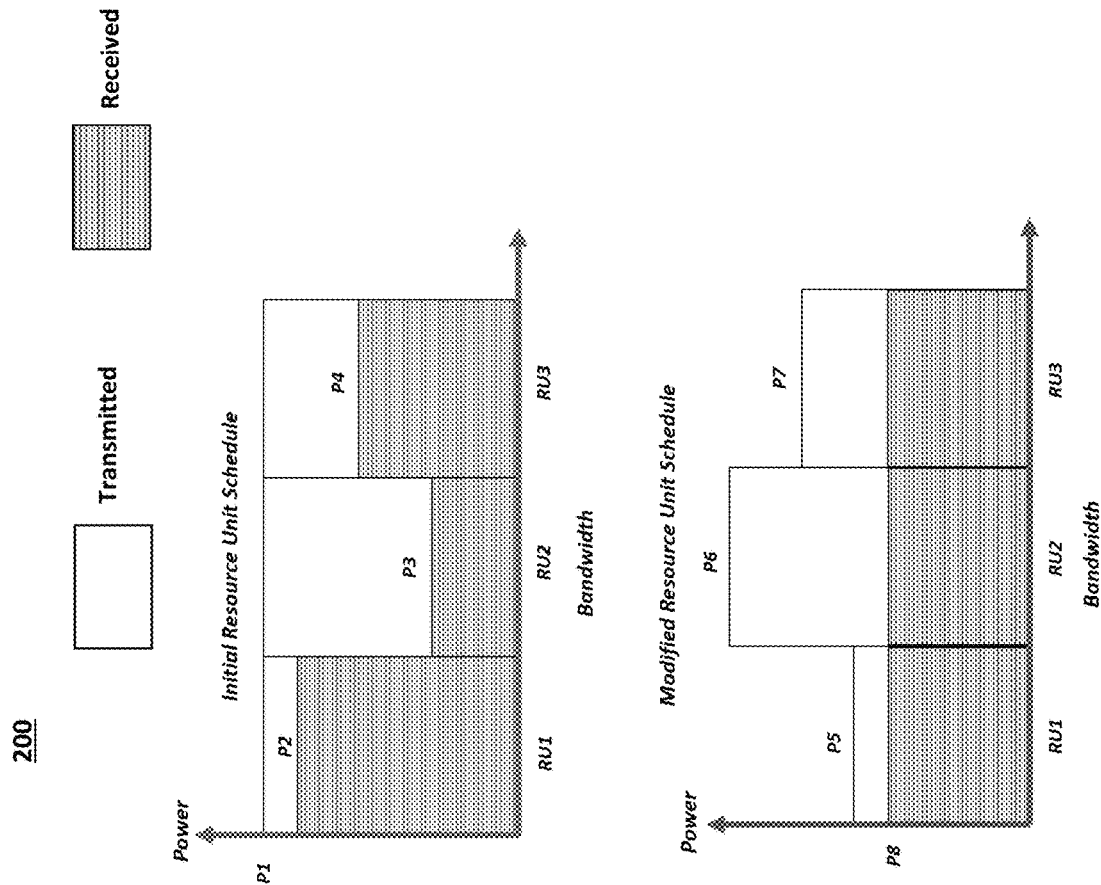
FIG. 2 shows an illustrative example of power adjustments across various resource units to equalize perceived power levels at client devices, in accordance with some embodiments of the disclosure.

FIG. 2 shows illustrative example 200 of power adjustments across various resource units to equalize perceived power levels at client devices, in accordance with some embodiments of the disclosure. Client devices at the edge of a range of Wi-Fi coverage experience low downlink signal-to-noise ratio (SNR) due to the attenuation of the signal transmitted by an access point (e.g., AP 102). As a result, the data rate of edge client devices is lower than client devices in the center of the range of coverage. SNR can be improved by increasing the power of transmission from AP 102, but the maximum transmission power is typically limited by regulatory rules. Referring to example 100, AP 102 may seek to schedule client devices 104, 106, and 108 in an OFDMA frame in which client device 104 is physically the closest to AP 102 and client device 106 is the farthest (e.g., closer to the edge of the range of Wi-Fi coverage). To boost the SNR of client device 106 (i.e., the coverage-edge client device), AP 102 may transmit signals with higher power over RU2, which is the resource unit allocated for communications with client device 106, and may use lower power for the signals transmitted over RU1 and RU3, which are resource units allocated for communications with the client devices closer to AP 102.

This custom transmission scheme is made possible by using resource unit management. The minimum scheduling unit in OFDMA is a "resource unit" (e.g., ~2 MHz). An access point may allocate one or more resource units in an OFDMA frame to a client device. While the total power over all resource units in a given wireless channel is upper-bounded by the allowed maximum transmission power (e.g., per regulations by the Federal Communications Commission (FCC)), the transmission power over individual resource units may vary so long as the individual transmission power is limited to the power spectral density specified by a regulator. For example, per FCC regulation, the power spectral density cannot exceed 17 dbM/MHz in UNI-1/UNI-3 bands and 11 dBm/MHz in UNI-2 band.

In example 200, each client device in example 100 is allocated a resource unit in a wireless channel (e.g., with a channel bandwidth of 80 MHz) by AP 102. AP 102 allocates RU1 for client device 104, RU2 for client device 106, and RU3 for client device 108. The bar graph "Initial Resource Unit Schedule" indicates that a transmission by AP 102 is sent at power level P1 to each client device. The received signals at the respective client devices each have a different perceived power level, namely, client device 104 perceives a signal power of P2, client device 106 perceives a signal power of P3, and client device 108 perceives a signal power of P4. As depicted in example 100, client device 106 is the farthest away from AP 102 and thus perceives the lowest signal power P3. It is also possible that the perceived signal power is affected by factors such as physical obstructions (e.g., walls) and noise.

As client devices 104, 106, and 108 are compatible with 802.11ax, AP 102 is able to adjust the individual transmission power for a signal sent to a respective client device over a particular resource unit. For example, in the bar graph "Modified Resource Unit Schedule," AP 102 adjusts the transmission power over each resource unit to equalize the perceived signal powers of the received signals at the client devices. Over RU1, AP 102 transmits at power P5. Over RU2, AP 102 transmits at power P6. Over RU3, AP 102 transmits at power P7. By making these adjustments, the perceived signal power at each client device is P8. In accordance with regulations, the sum of P5, P6 and P7 is less than or equal to the total transmission power allotted for all resource units in a given wireless channel. Furthermore, the individual powers P5, P6 and P7 are each less than or equal to the maximum individual transmission power for the resource units RU1, RU2 and RU3.

AP 102 may specifically determine the value P8 by averaging P2, P3 and P4. In response to determining P8, AP 102 may adjust the transmission power over each resource unit, while monitoring the perceived signal power at a client device (e.g., the client device may communicate the value of the perceived signal power to AP 102). In response to determining that P8 has been achieved as a perceived signal power for a client device, AP 102 ceases the adjustment of the transmission power and initiates transmission power adjustment for the next client device.

Figure 3:
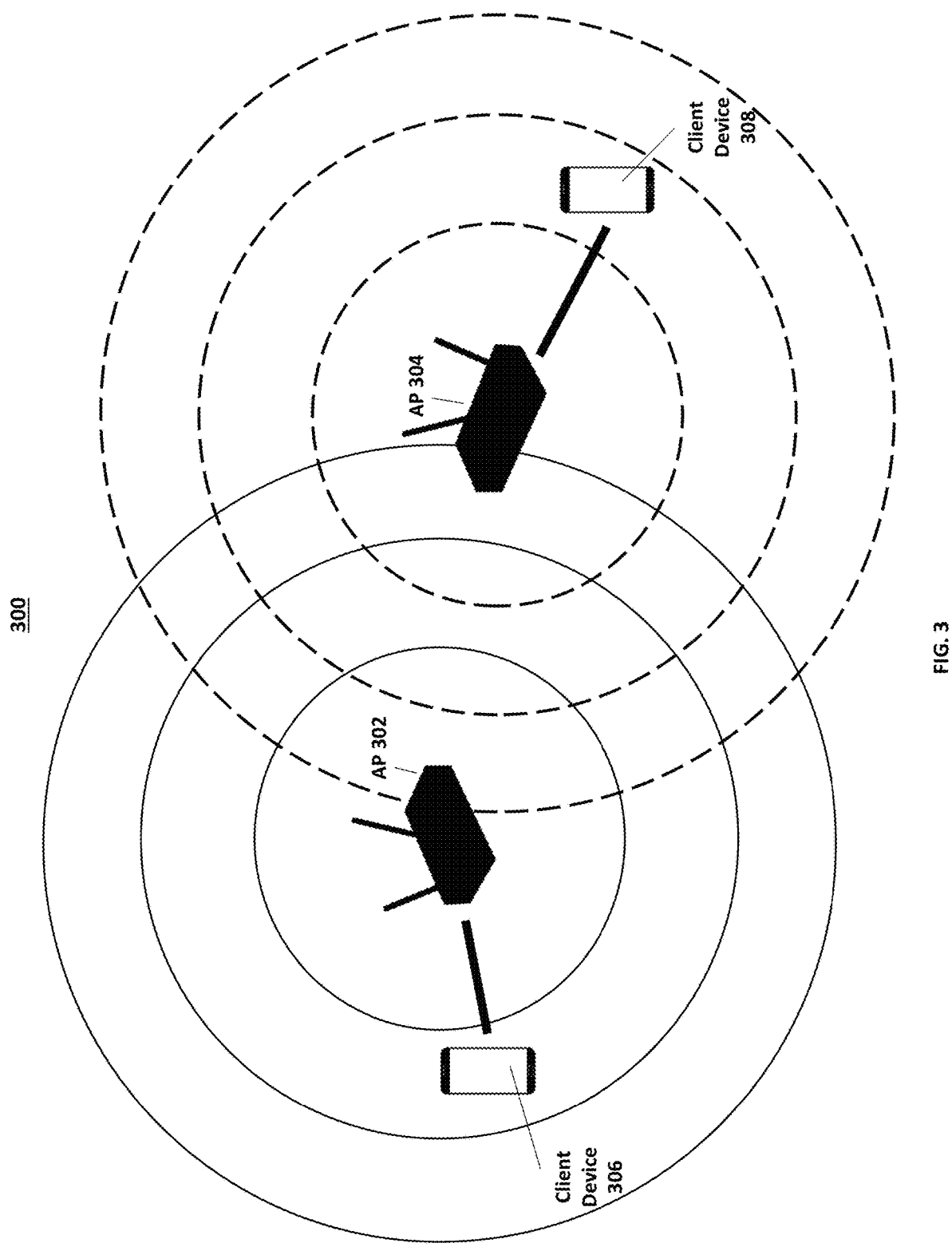
FIG. 3 shows an illustrative example of two access points, each communicating with a distinct client device, in accordance with some embodiments of the disclosure.

FIG. 3 shows illustrative example 300 of two access points, each communicating with a distinct client device, in accordance with some embodiments of the disclosure. Example 300 depicts two access points, AP 302 and AP 304. AP 302 is serving client device 306 and AP 304 is serving client device 308. AP 302 and client device 306 are compatible with 802.11ax, whereas AP 304 and client device 308 are compatible with a legacy Wi-Fi standard (e.g., 802.11n). The solid circles represent the range of AP 302's Wi-Fi coverage. The circles with dashed lines represent the range of AP 304's Wi-Fi coverage. As mentioned in example 100, each circle has a radius that represents a distance from the access point (e.g., 25 meters). For example, the smallest circle may have a radius of 25 meters, the middle circle may have a radius of 50 meters, and the largest circle may have a radius of 75 meters. As can be seen, there is overlap between the solid circles and the circles with dashed lines. This overlap is a representation of interference. As depicted, transmissions from AP 302 reach AP 304 and transmissions from AP 304 reach AP 302.

Figure 4:
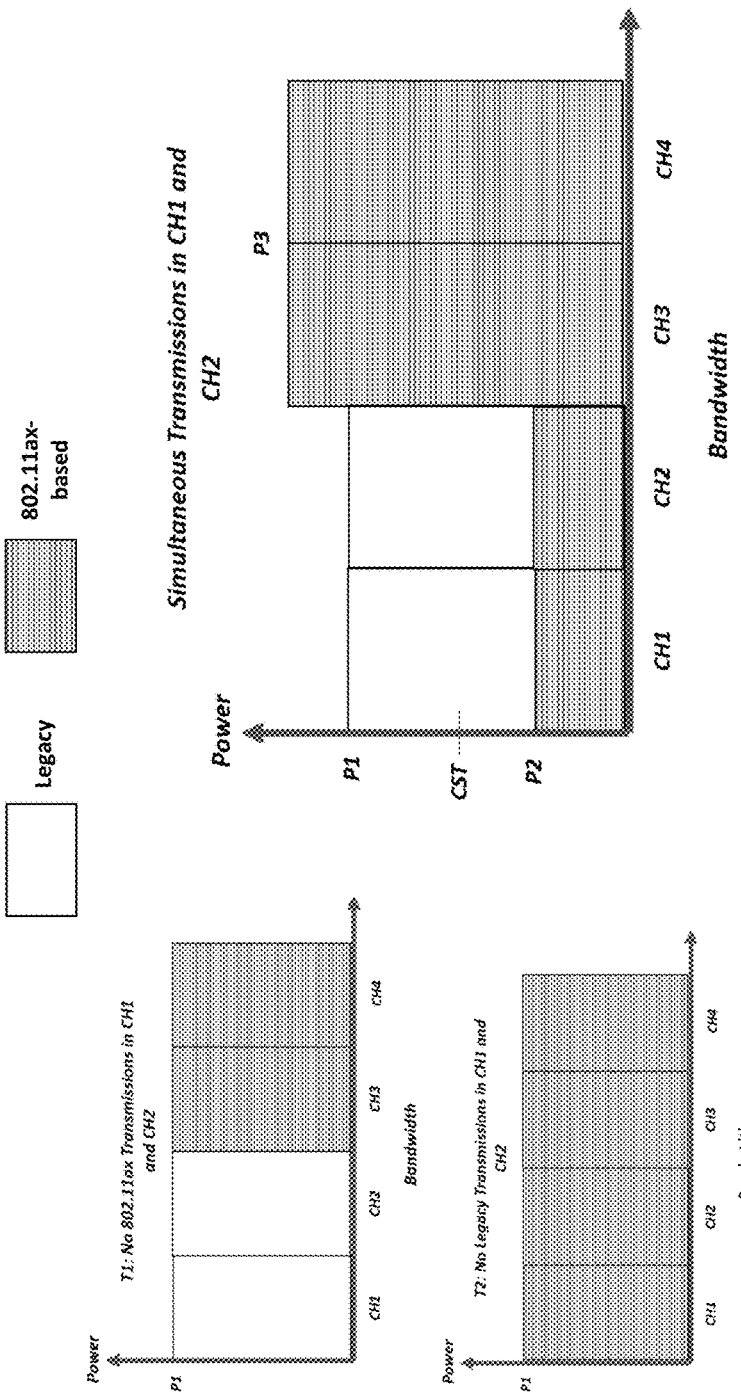
FIG. 4 shows an illustrative example of enabling simultaneous transmissions across multiple channels, in accordance with some embodiments of the disclosure.

FIG. 4 shows illustrative example 400 of enabling simultaneous transmissions across multiple channels, in accordance with some embodiments of the disclosure. When 802.11ax is deployed in scenarios where legacy devices (e.g., 802.11a/g/n/ac access points and client devices) are present, some of the benefits of 802.11ax are lost because 802.11ax devices cannot co-exist with non-802.11ax devices per legacy rules. For instance, if a legacy device is transmitting on a wireless channel, the 802.11ax device will have to back off from transmitting. Likewise, if an 802.11ax device is transmitting on the wireless channel, the legacy device will have to back off from transmitting. Referring to example 300, consider an 80 MHz wireless channel in which legacy client devices (e.g., client device 308) occupy a part of the bandwidth (e.g., 40 MHz) and 802.11ax client devices occupy the entire bandwidth. The 80 MHz wireless channel is further divided into four 20 MHz portions. These 20 MHz portions may be referred to as channels or resource units. Because legacy devices do not use resource units, in example 400, the portions are referred to as channels for simplicity. One skilled in the art would recognize, however, that an 802.11ax device may consider the portions as resource units. According to the table in example 400, client device 308, a legacy device, specifically occupies channels 1 and 2 and client device 306, an 802.11ax device, occupies all four channels. In other words, the first 40 MHz can be used by both legacy and 11ax transmissions while the remaining 40 MHz is restricted to 11ax client devices only. In this case, a legacy transmission is a message that was sent from a legacy access point or a legacy client device (i.e., operating using a Wi-Fi standard that precedes 802.11ax).

Referring to the bar graph "T1: No 802.11ax Transmissions in CH1 and CH2" (henceforth T1), when AP 302 is not transmitting to client device 306 over channel 1 (CH1) and channel 2 (CH2), AP 304 is able to send legacy transmissions to client device 308. This is because AP 304 does not detect a transmission from AP 302 and therefore does not back off from transmitting. Referring to the bar graph "T2: No Legacy Transmissions in CH1 and CH2" (henceforth T2), when AP 302 is transmitting to client device 306 over CH1 and CH2, AP 304 backs off from transmitting. As depicted, AP 304 is transmitting at power P1 in bar graph T1 and is not transmitting (i.e., power is zero) in bar graph T2. It should be noted that because AP 304's transmissions to client device 308 do not occupy channel 3 (CH3) and channel 4 (CH4), AP 302 is able to transmit to client device 306 at power P1 in both bar graph T1 and T2.

To resolve the issue of legacy devices (e.g., access points and clients) backing off from transmitting, one approach is to reduce the power of 802.11ax transmissions in the portions of bandwidth occupied by legacy devices. Specifically, AP 304 detects that AP 302's transmission is occupying a portion of bandwidth using carrier sense. If the carrier sense threshold of AP 304 is exceeded by the power of the transmission from AP 302 to client device 306, as perceived by AP 304, AP 304 will determine that the portion of bandwidth is being occupied and will back off. By reducing the power of 802.11ax transmissions, the received signal strength indicator (RSSI) at a legacy transmitter can be made below the carrier sense threshold of the legacy transmitter, thus preventing the trigger for backing off. Accordingly, AP 302 decreases the power level for transmissions to client device 306. Referring to the bar graph "Simultaneous Transmissions in CH1 and CH2," power levels of legacy transmission by AP 304 and power levels of 802.11ax transmissions detected at AP 304 are depicted. In CH1 and CH2, the RSSI of 802.11ax transmissions is P2, which is below the carrier sense threshold (CST) of AP 304 as per the power adjustments made by AP 302 over CH1 and CH2. Because P2 is below CST, AP 304 is able to transmit over CH1 and CH2 at power level P2 simultaneously with AP 302. In some embodiments, the two access points communicate their respective carrier sense thresholds to one another and adjust power levels for transmissions over certain portions of bandwidth based on those carrier sense thresholds. Decreasing the power level of transmissions over CH1 and CH2 may be balanced by AP 302 by increasing the power level of transmissions over CH3 and CH4.

In order to satisfy potential regulatory requirements, the following conditions may apply to the power values shown in the bar graph "Simultaneous Transmissions in CH1 and CH2":

$$P1 <= P_{max} \quad (i)$$

$$P_{T2} + P_{T3} <= P_{max} \quad (ii)$$

$$P1 - P_L <= CST_1 \quad (iii)$$

$$P_{T2} - P_L <= CST_2 \quad (iv)$$

Condition (i) indicates that the power level of legacy transmissions from AP 304 (i.e., P1) are less than or equal to the maximum allowed power over the 80 MHz wireless channel (including CH1, CH2, CH3, and CH4). Condition (ii) indicates that the sum of power levels of 802.11ax transmissions originating from AP 302 (i.e., $P_{T2}$ and $P_{T3}$) is less than or equal to the maximum allowed power over the 80 MHz wireless channel. For condition (iii), $CST_1$ represents the carrier sense threshold of AP 302. P1 is indicative of the power level of transmissions by AP 304. $P_L$ represents the pathloss between AP 304 and AP 302. Condition (iii) indicates that carrier sense threshold of AP 302 is greater than or equal to the RSSI of transmissions by AP 304 detected at AP 302 over CH1 and CH2. For condition (iv), $CST_2$ represents the carrier sense threshold of AP 304. Condition (iv) indicates that the carrier sense threshold of AP 304 is greater than or equal to the RSSI of transmissions by AP 302 detected at AP 304 over CH1 and CH2. These four conditions allow AP 302 and AP 304 to follow potential regulations while enabling simultaneous transmissions over CH1 and CH2.

Figure 5:
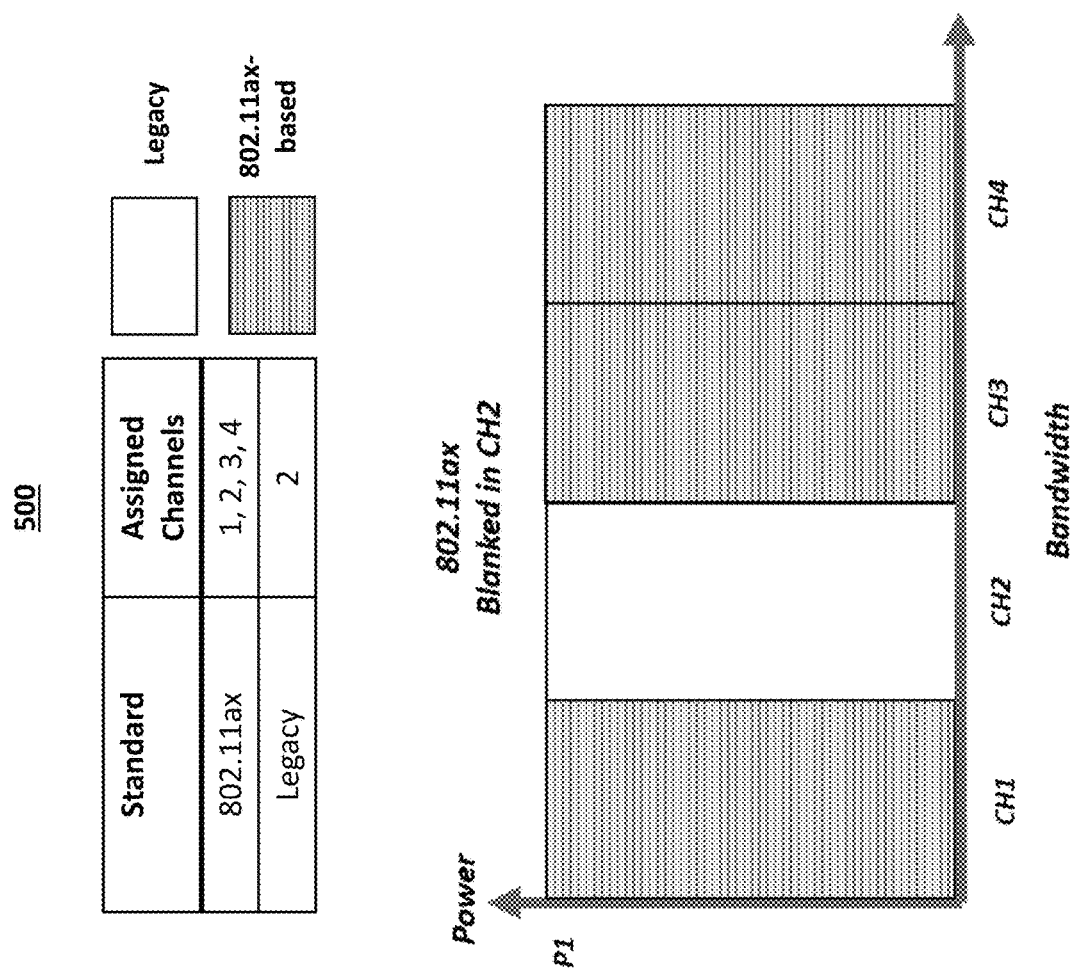
FIG. 5 shows an illustrative example of blanking transmissions in a wireless channel occupied by a legacy device, in accordance with some embodiments of the disclosure.

FIG. 5 shows illustrative example 500 of blanking transmissions in a wireless channel occupied by a legacy device, in accordance with some embodiments of the disclosure. As discussed previously, if a transmission is ongoing on a wireless channel, other devices will not use the wireless channel at the same time, opting instead to back off from transmitting. This is inefficient spectrum usage. An approach other than adjusting power levels for transmission involves selectively blanking parts of the wireless channel where a transmission is detected and continuing to use the remaining part of the wireless channel, without causing interference to other transmitters. Blanking refers to the act of not scheduling transmissions over a band of the spectrum.

In this approach, 802.11ax devices detect the presence of a legacy devices within the channel bandwidth that the 802.11ax device is operating in. In response to determining that a legacy device occupies a portion of the channel bandwidth that the 802.11ax device is operating in, the 802.11ax device will not utilize any of the resource units within the portion for its own transmissions or client uplink transmissions.

Determining whether a legacy device occupies a portion of the channel bandwidth may be a coordinated or an uncoordinated process. In a coordinated process, the access points (e.g., 802.11ax-based or legacy-based) involved in scheduling resource units may directly communicate with one another to decide the portions of the channel bandwidth each will occupy. Direct communication is possible, for example, when the access points all belong to the same vendor. The 802.11ax access point will accordingly avoid resource unit allocation in the designated legacy portions of the channel bandwidth whenever a legacy access point is transmitting. In an uncoordinated method, the 802.11ax access point may sense the presence of a legacy transmission in a portion of the channel bandwidth and may blank the portion.

In example 500, an 80 MHz wireless channel is split into four 20 MHz channels (which may also be referred to as resource units). An 802.11ax access point (e.g., AP 302) occupies the entire 80 MHz channel, whereas a legacy access point (e.g., AP 304) occupies only channel 2 (CH2) of the four channels. The 802.11ax access point detects a transmission by the legacy access point in CH2, and blanks 802.11ax transmissions in CH2 to prevent interference (e.g., as depicted in the bar graph "802.11ax Blanked in CH2"). In the scenario where both the legacy access point and the 802.11ax access point are from the same vendor (e.g., Arista Networks), the respective access points can coordinate on which channels to blank and which channels to occupy.

Figure 6:
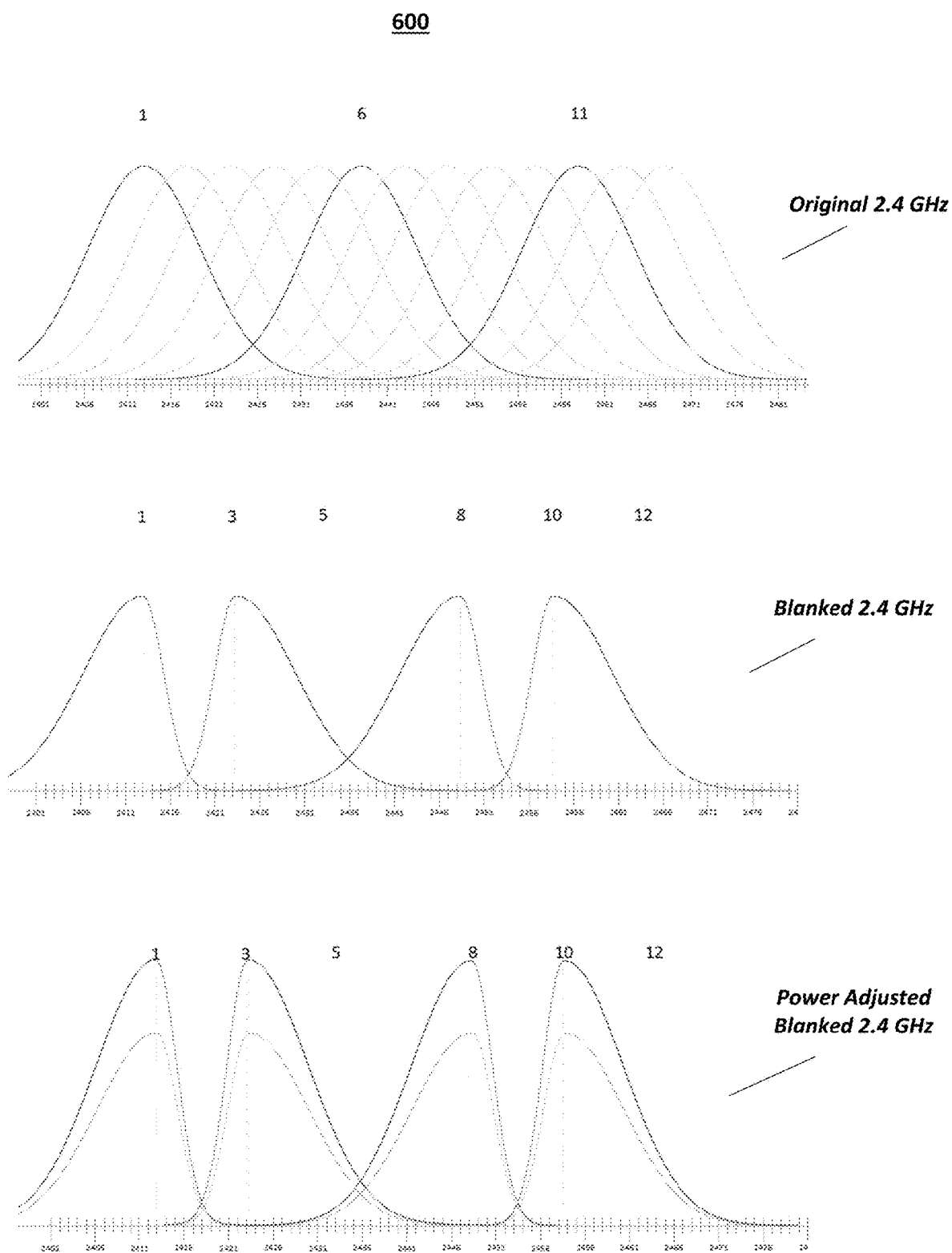
FIG. 6 is an illustrative example of blanking channels in the 2.4 GHz band, in accordance with some embodiments of the disclosure.

FIG. 6 is illustrative example 600 of blanking channels in the 2.4 GHz band, in accordance with some embodiments of the disclosure. Example 600 first shows an "Original 2.4 GHz" band, which features only three non-overlapping channels (e.g., channels 1, 6 and 11). One of benefits of resource unit blanking in 802.11ax is improved utilization of overlapping channels such as 1, 3, 5, 7, 9, 11, 13. Specifically, the lower 10 MHz of an overlapping channel (e.g., channel 1) can coexist with the upper 10 MHz of a subsequent overlapping channel (e.g., channel 3) by blanking the upper 10 MHz of the overlapping channel (e.g., channel 1) and lower 10 MHz of the subsequent overlapping channel (e.g., channel 3). The graph labelled "Blanked 2.4 GHz" is an example in which channels 1, 3, 5, 7, 9, 11, 13 can be utilized by blanking resource units in the overlapping region. This approach frees up to 70 MHz of non-overlapping bandwidth whereas "Original 2.4 GHz" depicts only 60 MHz of non-overlapping bandwidth (e.g., channels 1, 6 and 11). More importantly, this approach provides seven non-overlapping channels, rather than three.

Rather than completely blanking the resource units in overlapping regions, 802.11ax access points may choose to transmit at lower power on resource units that lie in the overlapping region to reduce adjacent channel interference (ACI). The residual power can be re-allocated to resource units in the non-overlapping region. The clear channel assessment (CCA) thresholds can be adjusted accordingly. In the graph "Power Adjusted Blanked 2.4 GHz," the height of each curve indicates the relative power level of transmissions over the corresponding resource units. Because the upper 10 MHz of channel 1 is blanked or reduced in power, for example, an 802.11ax access point can increase the power levels of transmission in the lower 10 MHz of channel 1.

Figure 7:
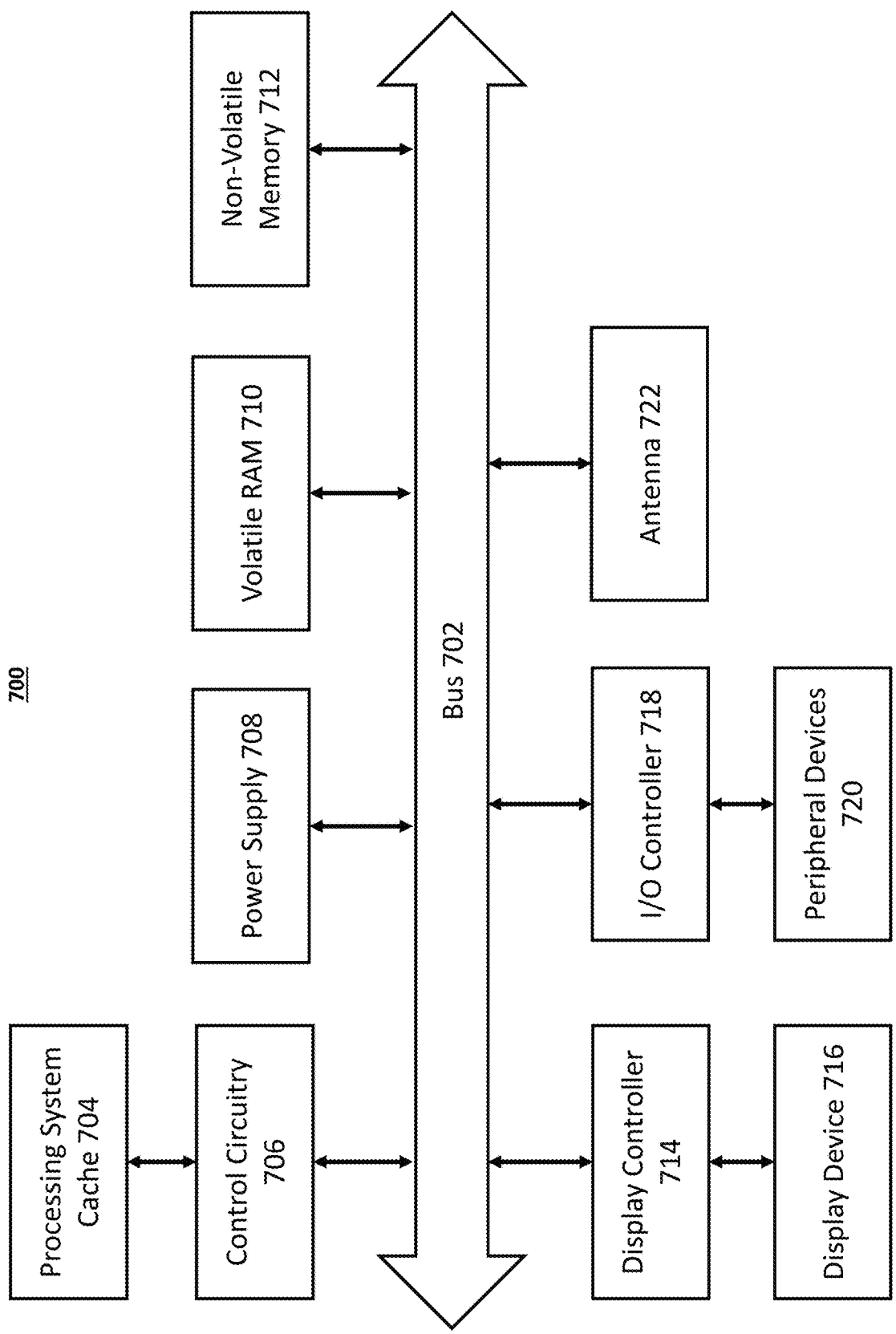
FIG. 7 illustrates one example of an access point, which may be used in conjunction with the embodiments described herein.

FIG. 7 illustrates one example of an access point, which may be used in conjunction with the embodiments described herein. As shown in FIG. 7, the access point 700, which is a form of a data processing system, includes a bus 702 which is coupled to a power supply 708, control circuitry 706, a processing system cache 704, volatile RAM 710 and a non-volatile memory 712. The bus 702 interconnects these various components and also interconnects these components 704, 706, 708, 710, and 712 to a display controller 714, display device 716, I/O controller 718, antenna 722 and peripheral devices 720 such as input/output (I/O) devices which may be modems, network interfaces, and other devices which are well known in the art.

Typically, the input/output devices 720 are coupled to the access point through input/output controllers 718. The volatile RAM (Random Access Memory) 710 is typically implemented as dynamic RAM (DRAM), which requires power continually in order to refresh or maintain the data in the memory.

Control circuitry 706 may retrieve instructions from the memories 704, 710, 712 and execute the instructions to perform operations described above. As referred to herein, control circuitry should be understood to mean circuitry based on one or more microprocessors, microcontrollers, digital signal processors, programmable logic devices, application-specific integrated circuits (ASICs), etc., and may include a multi-core processor (e.g., dual-core, quad-core, etc.). Control circuitry 706 may be used to send and receive commands, requests, and other suitable data using I/O controller 718, display controller 714, and/or antenna 722.

Antenna 722 is an interface between radio waves propagating through space and electric currents moving in metal conductors. During transmission, control circuitry 706 supplies an electric current to antenna 722, which radiates the energy from the electric current as electromagnetic waves. During reception, antenna 722 intercepts a radio wave in order to produce an electric current at its terminals for processing by control circuitry 706. Antenna 722 is shown as a single component for simplicity, but may represent multiple internal and external antennas, each configured to transmit and/or receive over a band of frequency (e.g., 2.4 GHz, 5 GHz, etc.).

In one embodiment, the access point 700 includes a plurality of network interfaces of the same or different types (e.g., Ethernet copper interface, Ethernet fiber interfaces, wireless, and/or other types of network interfaces). In this embodiment, the access point 700 can include a forwarding engine to forward network data received on one interface out through another interface.

The non-volatile memory 712 is typically a magnetic hard drive, a magnetic optical drive, an optical drive, a DVD RAM, a flash memory, or other type of memory systems which maintains data (e.g., large amounts of data) even after power is removed from the access point. Typically, the mass storage 712 will also be a random-access memory, although this is not required. While FIG. 7 shows that the mass storage 712 is a local device coupled directly to the rest of the components in the access point, it will be appreciated that the present disclosure may utilize a non-volatile memory which is remote from the access point, such as a network storage device that is coupled to the data processing system through a network interface such as a modem, an Ethernet interface or a wireless network. The bus 702 may include one or more buses connected to each other through various bridges, controllers and/or adapters, as is well known in the art.

Portions of what was described above may be implemented with logic circuitry such as a dedicated logic circuit or with a microcontroller or other form of processing core that executes program code instructions. Thus, processes taught by the discussion above may be performed with program code, such as machine-executable instructions that cause a machine that executes these instructions to perform certain functions. In this context, a "machine" may be a machine that converts intermediate-form instructions into processor-specific instructions (e.g., an abstract execution environment such as a "process virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions, such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present disclosure also relates to an apparatus for performing the operations described herein. This apparatus may be specially constructed for the required purpose, or it may comprise a general-purpose computer selectively activated or reconfigured by a program stored in the access point. The instructions for performing any of the embodiments discussed herein of the program may be encoded on non-transitory computer-readable media (e.g., a hard drive, random-access memory on a DRAM integrated circuit, read-only memory, etc.) or transitory computer-readable media (e.g., propagating signals carrying data and/or instructions).

An article of manufacture may be used to store program code. An article of manufacture that stores program code may be embodied as, but is not limited to, one or more memories (e.g., one or more flash memories, random access memories (static, dynamic or other)), optical disks, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present disclosure is not described with reference to any particular programming language. It will be appreciated that a variety of programming languages may be used to implement the teachings of the disclosure as described herein.

The foregoing discussion merely describes some exemplary embodiments. One skilled in the art will readily recognize from such discussion, the accompanying drawings and the claims that various modifications can be made without departing from the spirit and scope of the disclosure.

Figure 8:
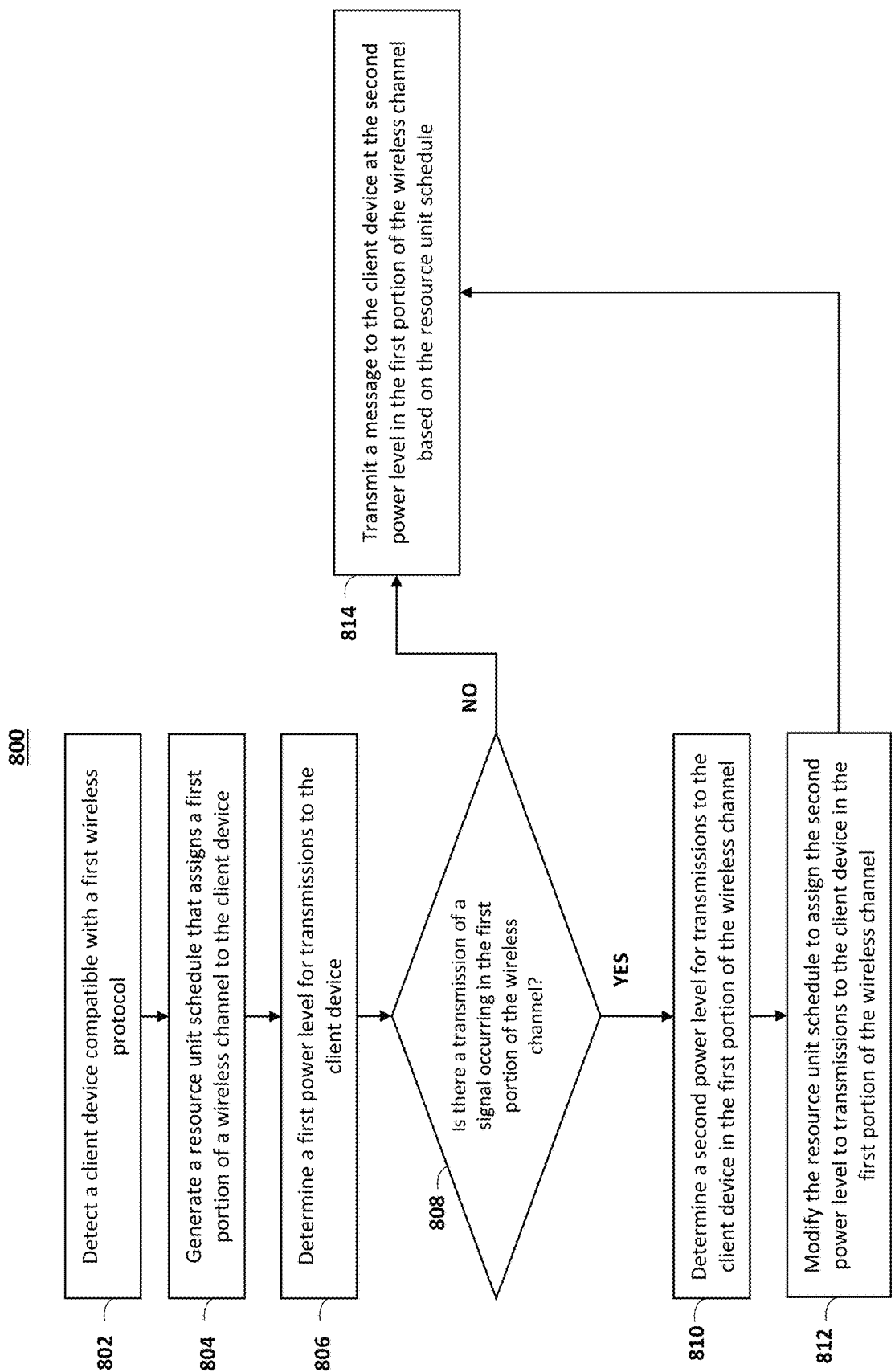
FIG. 8 is a flowchart of an illustrative process for adjusting a power level for transmissions over a first portion of a wireless channel in response to detecting a transmission occurring in the first portion, in accordance with some embodiments of the disclosure.

FIG. 8 is a flowchart of illustrative process 800 for adjusting a power level for transmissions over a first portion of a wireless channel in response to detecting a transmission occurring in the first portion, in accordance with some embodiments of the disclosure. At 802, control circuitry 706 (e.g., of AP 302) detects a client device (e.g., client device 306) compatible with a first wireless protocol (e.g., 802.11ax). For example, antenna 722 of AP 302 may receive a signal from client device 306. At 804, control circuitry 706 generates a resource unit schedule that assigns a first portion (e.g., any combination of resource units) of a wireless channel to the client device. Referring to FIG. 4, AP 302 may assign portions CH1 and CH2 for transmissions to client device 306. At 806, control circuitry 706 determines a first power level (e.g., P1 of bar graph "No Legacy Transmissions in CH1 and CH2" of FIG. 4) for transmissions to the client device. AP 302 may specifically set the first power level to be the maximum power that can be assigned over a resource unit/channel per regulations.

At 808, control circuitry 706 determines whether there is a transmission of a signal (e.g., an 802.11ax transmission or a legacy transmission) occurring in the first portion (e.g., CH1 and CH2) of the wireless channel. In response to detecting a transmission of a signal occurring in the first portion of the wireless channel, at 810, control circuitry 706 determines a second power level for transmissions to the client device in the first portion of the wireless channel. Referring to the bar graph "Simultaneous Transmissions in CH1 and CH2" of FIG. 4, the second power level may be P2 (e.g., assuming that pathloss between AP 302 and AP 304 is negligible). At 812, control circuitry 706 modifies the resource unit schedule to assign the second power level to transmissions to the client device in the first portion of the wireless channel. Control circuitry 706 may store the resource unit schedule in any memory 704, 710 and/or 712. Furthermore, control circuitry 706 may communicate the resource unit schedule to other access points and client devices via antenna 722.

Process 800 then proceeds to 814, where control circuitry 706 transmits a message (e.g., via antenna 722) to the client device at the second power level in the first portion of the wireless channel based on the resource unit schedule. It should be noted that process 800 may also proceed to 814 in response to determining that no transmission of a signal is occurring in the first portion of the wireless channel. In that case, the power level of the transmission would remain at the first power level.

In some embodiments, control circuitry 706 may determine, in between 808 and 810, whether the transmission of the signal is of the first wireless protocol. If control circuitry 706 determines that the transmission of the signal is not of the first wireless protocol, process 800 proceeds to 814, otherwise, process 800 proceeds to 810. This determination is further discussed in process 900.

Figure 9:
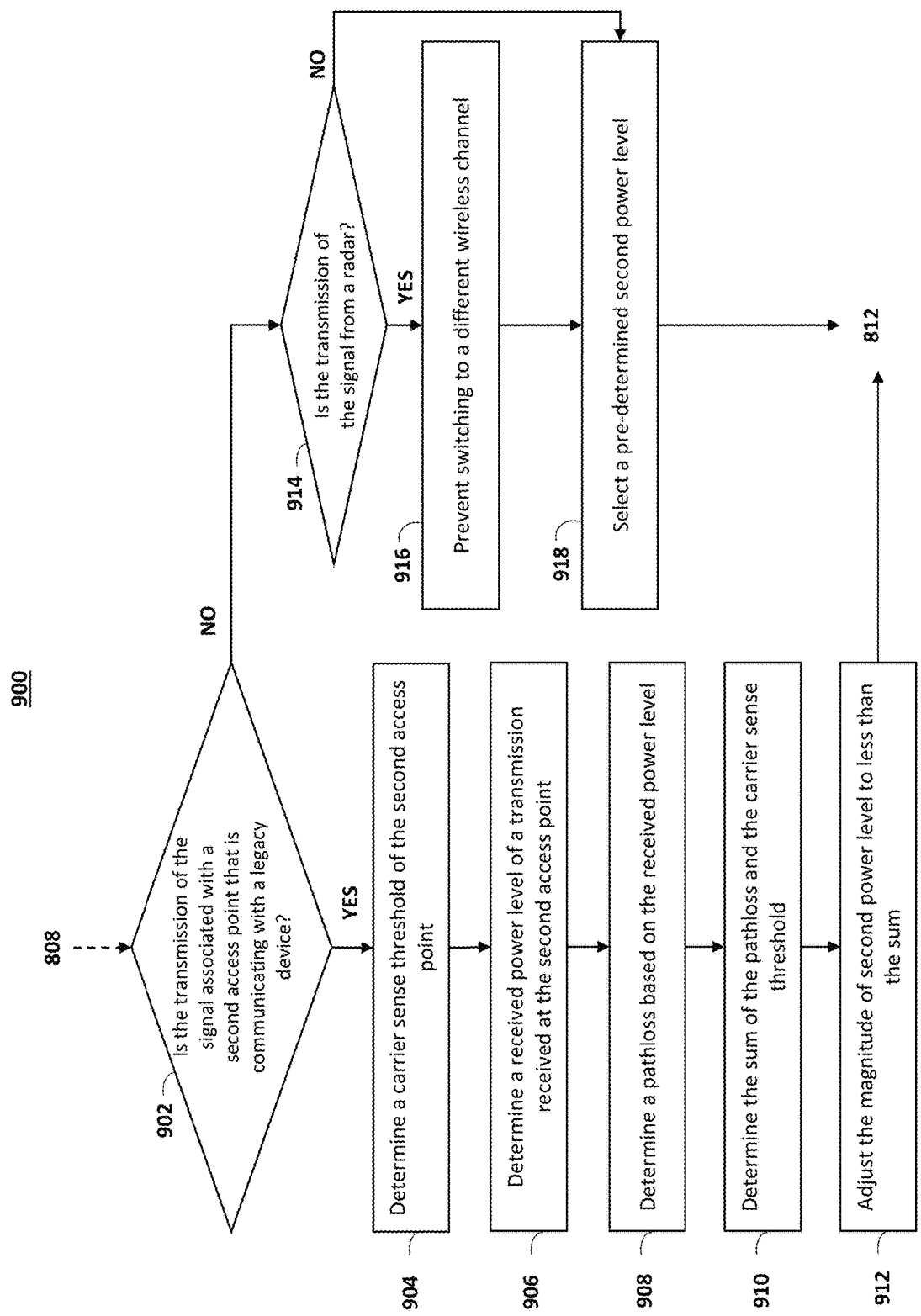
FIG. 9 is a flowchart of an illustrative process for determining the adjusted power level over the first portion of the wireless channel, in accordance with some embodiments of the disclosure.

FIG. 9 is a flowchart of illustrative process 900 for determining the adjusted power level over the first portion of the wireless channel, in accordance with some embodiments of the disclosure. Process 900 may be executed by control circuitry 706 between steps 808 and 812 of process 800 as an alternative to 810. At 902, control circuitry 706 determines whether the transmission of the signal is associated with a second access point (e.g., AP 304) that is communicating with a legacy device (e.g., client device 308). In response to determining that the transmission of the signal is associated with a second access point communicating with a legacy device, process 900 proceeds to 904, where control circuitry 706 determines a carrier sense threshold of the second access point. For example, control circuitry 706 of AP 302 may request the carrier sense threshold value from AP 304 in a query message transmitted via antenna 722. In response to the request, control circuitry 706 of AP 304 may respond with the value CST, as depicted in the bar graph "Simultaneous Transmissions in CH1 and CH2" in FIG. 4.

At 906, control circuitry 706 determines a received power level of a transmission received at the second access point (e.g., P2). At 908, control circuitry 706 determines a pathloss between the respective access points (e.g., $P_L$ between AP 302 and AP 304) based on the received power level. For example, the pathloss represents the difference between the power at AP 302 for a transmitted signal and the RSSI value of the signal when received at AP 304. At 910, control circuitry 706 determines the sum of the pathloss and the carrier sense threshold. At 912, control circuitry 706 adjusts the magnitude of second power level to less than the sum. This satisfies condition (iii) in the previous discussion of regulations.

From 912, process 900 ends and 814 of process 800 initiates. If, at 902, control circuitry 706 determines that the transmission of the signal is not associated with a second access point that is communicating with a legacy device, process 900 proceeds to 914, where control circuitry 706 determines whether the transmission of the signal is from a radar. This is a special-case scenario when the access point is operating in the 5 GHz band and dynamic frequency selection (DFS) is utilized for a plurality of resource units. In DFS, an access point monitors for radar signals (e.g., used for weather, aviation, etc.) and upon detection of a radar signal, switches the channel for transmissions automatically. In response to determining that the transmission is from a radar, at 916, control circuitry 706 prevents switching to a different wireless channel. At 918, control circuitry 706 selects a pre-determined second power level (e.g., retrieved from memory 704, 710 and/or 712) for assignment in the resource unit schedule. In some embodiments, control circuitry 706 blanks transmissions over the impacted resource units that correspond to the first portion of the wireless channel (e.g., no power attributed to the impacted resource units). For example, an 802.11ax access point operating in a DFS channel over 80 MHz bandwidth may detect radar activity. While a legacy access point would normally switch to 20/40 MHz mode in response to the detection of radar activity, the 802.11ax access point can continue to work in 80 MHz mode by blanking the resource units where the radar activity is present. If, at 914, control circuitry 706 determines that the transmission is not from a radar, control circuitry 706 may skip 916 and proceed to 918. From 918, process 900 ends and 814 of process 800 initiates.

Figure 10:
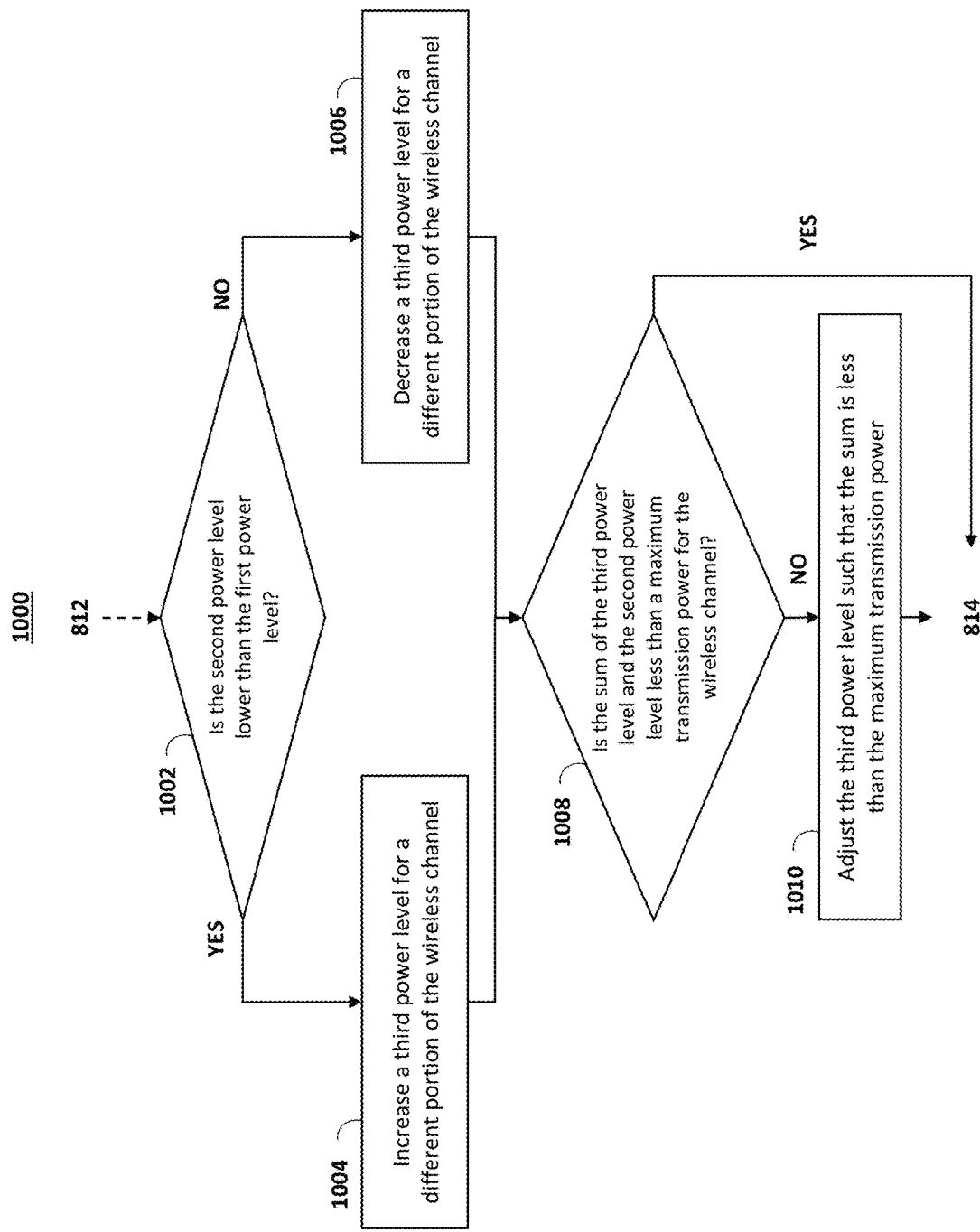
FIG. 10 is a flowchart of an illustrative process for adjusting power levels for transmissions over various portions of a wireless channel, in accordance with some embodiments of the disclosure.

FIG. 10 is a flowchart of illustrative process 1000 for adjusting power levels for transmissions over various portions of a wireless channel, in accordance with some embodiments of the disclosure. Process 1000 may be executed by control circuitry 706 (e.g., of AP 302) between steps 812 and 814 of process 800. The examples provided in the discussion of process 1000 stem from FIG. 4. At 1002, control circuitry 706 determines whether the second power level (e.g., P2 of the bar graph "Simultaneous Transmissions in CH1 and CH2" in FIG. 4) is lower than the first power level (e.g., P1). In response to determining that the second power level is lower than the first power level, at 1004, control circuitry 706 increases a third power level (e.g., P1 of the bar graph "No Legacy Transmissions in CH1 and CH2") for a different portion of the wireless channel (e.g., CH3 and CH4). For example, because control circuitry 706 has reduced the transmission powers over CH1 and CH2, control circuitry 706 increases the transmission powers over CH3 and CH4 from P1 to P3 (as depicted in the bar graph "Simultaneous Transmissions in CH1 and CH2").

In response to determining that the second power level is not lower than the first power level, at 1006, control circuitry 706 decreases a third power level for a different portion of the wireless channel. For example, if control circuitry 706 had increased the power levels for transmissions over CH1 and CH2, control circuitry 706 may balance the increase in power by decreasing the power levels for transmissions over CH3 and CH4.

At 1008, control circuitry 706 determines whether the sum of the third power level and the second power level is less than a maximum transmission power for the wireless channel. This determination refers back to condition (ii) in the discussion of whether potential regulatory requirements are satisfied. In response to determining that the sum is less than the maximum transmission power, process 1000 proceeds to 814 of process 800. In response to determining that the sum is not less than the maximum transmission power, at 1010, control circuitry 706 adjusts the third power level such that the sum is less than the maximum transmission power and subsequently proceeds to 814 of process 800.

Figure 11:
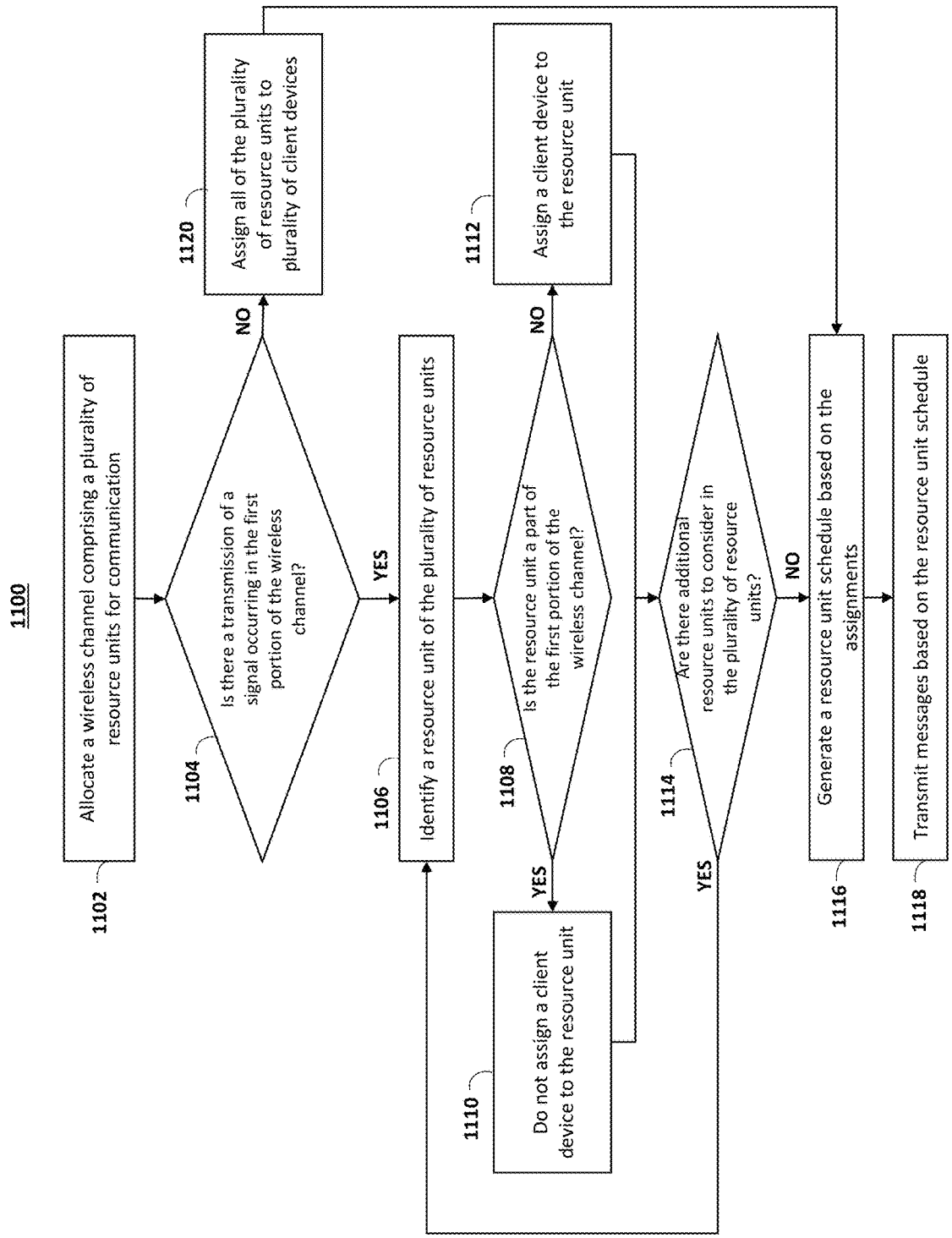
FIG. 11 is a flowchart of an illustrative process for blanking transmissions in portions of a wireless channel where external transmissions are detected, in accordance with some embodiments of the disclosure.

FIG. 11 is a flowchart of illustrative process 1100 for blanking transmissions in portions of a wireless channel where external transmissions are detected, in accordance with some embodiments of the disclosure. At 1102, control circuitry 706 allocates a wireless channel comprising a plurality of resource units for communication (e.g., an 80 MHz channel split into five resource units). At 1104, control circuitry 706 determines whether there is a transmission of a signal occurring in the first portion of the wireless channel. Referring to FIG. 5, control circuitry 706 may detect that a legacy device is transmitting over CH2. In response to determining that there is a transmission occurring, at 1106, control circuitry 706 identifies a resource unit of the plurality of resource units (e.g., a resource unit in CH1).

At 1108, control circuitry 706 determines whether the identified resource unit is a part of the first portion of the wireless channel. If, at 1108, control circuitry 706 determines that the resource unit is not part of the first portion of the wireless channel (e.g., CH1 is not CH2), at 1112, control circuitry 706 assigns a client device (e.g., client device 306) to the resource unit (e.g., a resource unit in CH1). Alternatively, in response to determining that the identified resource unit is a part of the first portion, process 1100 proceeds to 1110, where control circuitry 706 does not assign a client device to the resource unit. For example, if control circuitry 706 was considering a resource unit of CH2, control circuitry 706 would not assign the resource unit to a client device. The resource unit is therefore blanked because no transmissions from AP 302 will take place over the resource unit.

From 1110 and 1112, process 1100 proceeds to 1114, where control circuitry 706 determines whether there are additional resource units to consider in the plurality of resource units (e.g., the resource units of CH1-CH5). In response to determining that there are additional resource units to consider, process 1100 returns to 1106, where control circuitry 706 identifies a different resource unit of the plurality of resource units that have not yet been considered (e.g., also from CH1, or a different portion). If, at 1114, control circuitry 706 determines that all resource units have been considered, process 1100 proceeds to 1116, where control circuitry 706 generates a resource unit schedule based on the assignments. At 1118, control circuitry 706 transmits messages (e.g., via antenna 722) based on the resource unit schedule. If, at 1104, control circuitry 706 determines that another transmission is not occurring, process 1100 proceeds to 1120, where control circuitry 706 assigns all of the plurality of resource units to plurality of client devices (i.e., because blanking is not necessary). From 1120, process 1100 proceeds to 1118.

It should be noted that processes 800-1100 or any step thereof could be performed on, or provided by, any of the components shown in FIG. 7. In addition, one or more steps of a process may be incorporated into or combined with one or more steps of any other process or embodiment (e.g., steps from process 800 may be combined with steps from process 900). In addition, the steps and descriptions described in relation to FIGS. 8-11 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. In addition, the systems and methods described herein may be performed in real time. It should also be noted, the systems and/or methods described above may be applied to, or used in accordance with, other systems and/or methods.

What is claimed is:

1. A method for adjusting transmission power of devices communicating within a wireless channel, the method comprising:

assigning a first portion of a wireless channel to a client device, wherein an access point communicates with the client device using radio transmission at a first power level and in accordance to a first wireless protocol;

determining that a transmission of a second wireless protocol signal from a source different than the access point is occurring in the first portion of the wireless channel;

in response to determining that the transmission of the second wireless protocol signal is occurring in the first portion of the wireless channel, determining a second power level for transmissions by the access point to the client device in the first portion of the wireless channel;

assigning the second power level to transmissions made by the access point when communicating with the client device in the first portion of the wireless channel; and transmitting, from the access point, a message to the client device at the second power level in the first portion of the wireless channel, wherein the source of the transmission of the second wireless protocol signal originates from a legacy device that is configured to halt transmissions in the first portion of the wireless channel in response to detecting that other devices, including the access point, are transmitting signals in the first portion of the wireless channel, wherein the legacy device detects other devices, including the access point, that are transmitting signals in the first portion of the channel based on a carrier sense threshold of the legacy device, and wherein the method further comprises:

adjusting the second power level to be less than the carrier sense threshold of the legacy device; and transmitting, from the access point, the message to the client device at the adjusted second power level in the first portion of the wireless channel simultaneous with transmission, from the legacy device, of the second wireless protocol signal in the first portion of the wireless channel, wherein the wireless channel has a maximum allowed power level and wherein:

the power level of the second wireless protocol signal is less than the maximum allowed power level; and the second power level of transmissions by the access point in the first portion of the wireless channel plus a power level of transmissions by the access point in portions of the wireless channel other than the first portion is less than the maximum allowed power level, wherein the carrier sense threshold of the legacy device is greater than or equal to the second power level minus a path loss between the access point and the legacy device, and wherein a carrier sense threshold of the access point is greater than or equal to a power level of the second wireless protocol signal transmitted by the legacy device minus the path loss between the access point and the legacy device.

2. The method of claim 1, further comprising:

determining a difference between a maximum power level for the wireless channel and the second power level;

allocating the difference of the power levels for transmissions over one or more different portions of the wireless channel.

3. A system for adjusting transmission power of devices communicating on portions of a wireless channel, the system comprising:

means for assigning, at an access point, a first portion of a wireless channel to a client device, wherein the access point communicates with the client device using radio transmission at a first power level and in accordance to a first wireless protocol;

means for determining that a transmission of a second wireless protocol signal from a source different than the access point is occurring in the first portion of the wireless channel;

means for, in response to determining that the transmission of the second wireless protocol signal is occurring in the first portion of the wireless channel, determining a second power level for transmissions by the access point to the client device in the first portion of the wireless channel;

means for assigning the second power level to transmissions made by the access point when communicating with the client device in the first portion of the wireless channel; and means for transmitting, from the access point, a message to the client device at the second power level in the first portion of the wireless channel, wherein the source of the transmission of the second wireless protocol signal originates from a legacy device that is configured to halt transmissions in the first portion of the wireless channel in response to detecting that other devices, including the access point, are transmitting signals in the first portion of the wireless channel, wherein the legacy device detects other devices, including the access point, that are transmitting signals in the first portion of the channel based on a carrier sense threshold of the legacy device, and wherein the system further comprises:

means for adjusting the second power level to be less than the carrier sense threshold of the legacy device; and means for transmitting, from the access point, the message to the client device at the adjusted second power level in the first portion of the wireless channel simultaneous with transmission, from the legacy device, of the second wireless protocol signal in the first portion of the wireless channel, wherein the wireless channel has a maximum allowed power level and wherein:

the power level of the second wireless protocol signal is less than the maximum allowed power level; and the second power level of transmissions by the access point in the first portion of the wireless channel plus a power level of transmissions by the access point in portions of the wireless channel other than the first portion is less than the maximum allowed power level, wherein the carrier sense threshold of the legacy device is greater than or equal to the second power level minus a path loss between the access point and the legacy device, and wherein a carrier sense threshold of the access point is greater than or equal to a power level of the second wireless protocol signal transmitted by the legacy device minus the path loss between the access point and the legacy device.

4. The method of claim 1, wherein a received wireless signal at the legacy device in response to the transmitting, from the access point, of the message to the client device at the second power level in the first portion of the wireless channel has a received signal strength indicator (RSSI) that is less than the carrier sense threshold of the legacy device.

5. The method of claim 1, further comprising increasing a power level of transmissions by the access point in portions of the wireless channel other than the first portion of the wireless channel.

6. A method for blanking transmissions in a channel to reduce interference during simultaneous wireless transmissions, the method comprising:

allocating, at an access point, a wireless channel for communication in accordance with a first wireless protocol, wherein the wireless channel comprises a plurality of resource units defined for assignment to a plurality of client devices communicating in accordance with the first wireless protocol;

determining that a transmission of signals is occurring from a source different than the access point in a first portion of the wireless channel;

identifying a plurality of impacted resource units from the plurality of resource units, wherein the plurality of impacted resource units is in the first portion of the wireless channel;

assigning the plurality of resource units to the plurality of client devices communicating in accordance with the first wireless protocol, wherein the plurality of impacted resource units is not assigned to client devices for communication; and transmitting, from the access point, a message to a client device, wherein the source of the transmission of a second wireless protocol signal originates from a legacy device that is configured to halt transmissions in the first portion of the wireless channel in response to detecting that other devices, including the access point, are transmitting signals in the first portion of the wireless channel, wherein the legacy device detects other devices, including the access point, that are transmitting signals in the first portion of the channel based on a carrier sense threshold of the legacy device, and wherein the method further comprises:

adjusting a second power level to be less than the carrier sense threshold of the legacy device; and transmitting, from the access point, the message to the client device at the adjusted second power level in the first portion of the wireless channel simultaneous with transmission, from the legacy device, of the second wireless protocol signal in the first portion of the wireless channel, wherein the wireless channel has a maximum allowed power level and wherein:

the power level of the second wireless protocol signal is less than the maximum allowed power level; and the second power level of transmissions by the access point in the first portion of the wireless channel plus a power level of transmissions by the access point in portions of the wireless channel other than the first portion is less than the maximum allowed power level, wherein the carrier sense threshold of the legacy device is greater than or equal to the second power level minus a path loss between the access point and the legacy device, and wherein a carrier sense threshold of the access point is greater than or equal to a power level of the second wireless protocol signal transmitted by the legacy device minus the path loss between the access point and the legacy device.

7. The method of claim 6, further comprising increasing a power level for transmissions made by the access point when communicating over resource units that are (1) in the plurality of resource units and (2) not in the plurality of impacted resource units.

8. The method of claim 6, wherein the transmission of signals is centered on a different wireless channel that overlaps with the wireless channel, further comprising:

determining an overlapping region between the wireless channel and the different wireless channel;

identifying a second plurality of impacted resource units in the overlapping region, wherein the second plurality of impacted resource units is not assigned to client devices for communication.

9. A system for adjusting transmission power of devices communicating on portions within a wireless channel, the system comprising:

an electronic device including control circuitry configured to:

assign a first portion of a wireless channel to a client device, wherein communication between an access point and the client device occurs via radio transmission at a first power level and in accordance to a first wireless protocol;

determine that a transmission of a second wireless protocol signal is occurring from another device that is different than the electronic device including the control circuitry in the first portion of the wireless channel;

in response to determining that the transmission of the second wireless protocol signal is occurring in the first portion of the wireless channel, determine a second power level for transmissions to the client device in the first portion of the wireless channel;
assign the second power level to transmissions when communicating with the client device in the first portion of the wireless channel; and
transmit a message to the client device at the second power level in the first portion of the wireless channel,
wherein the transmission of the second wireless protocol signal originates from a legacy device that is configured to halt transmissions in the first portion of the wireless channel in response to detecting that other devices, including the access point, are transmitting signals in the first portion of the wireless channel,
wherein the legacy device detects other devices, including the access point, that are transmitting signals in the first portion of the channel based on a carrier sense threshold of the legacy device, and wherein the control circuitry is further configured to:
adjust the second power level to be less than the carrier sense threshold of the legacy device; and
transmit, from the access point, the message to the client device at the adjusted second power level in the first portion of the wireless channel simultaneous with transmission, from the legacy device, of the second wireless protocol signal in the first portion of the wireless channel,
wherein the wireless channel has a maximum allowed power level and wherein:
the power level of the second wireless protocol signal is less than the maximum allowed power level; and
the second power level of transmissions by the access point in the first portion of the wireless channel plus a power level of transmissions by the access point in portions of the wireless channel other than the first portion is less than the maximum allowed power level,
wherein the carrier sense threshold of the legacy device is greater than or equal to the second power level minus a path loss between the access point and the legacy device, and
wherein a carrier sense threshold of the access point is greater than or equal to a power level of the second wireless protocol signal transmitted by the legacy device minus the path loss between the access point and the legacy device.

10. The system of claim 9, wherein the legacy device detects other devices, including the access point, that are transmitting signals in the first portion of the channel based on a carrier sense threshold of the legacy device, and wherein the control circuitry is further configured to:
adjust the second power level to be less than the carrier sense threshold of the legacy device; and
transmit, from the access point, the message to the client device at the second power level in the first portion of the wireless channel simultaneous with transmission, from the legacy device, of the second wireless protocol signal in the first portion of the wireless channel.

11. The system of claim 9, wherein the control circuitry is further configured to:
determine a difference between a maximum power level for the wireless channel and the second power level;
allocate the difference of the power levels for transmissions over one or more different portions of the wireless channel.

12. A system for blanking transmissions in a channel to reduce interference during simultaneous wireless transmissions, the system comprising:
an electronic device including control circuitry configured to:
allocate a wireless channel for communication in accordance with a first wireless protocol, wherein the wireless channel comprises a plurality of resource units defined for assignment to a plurality of client devices communicating in accordance with the first wireless protocol;
determine that a transmission of signals is occurring from a source different than the electronic device including the control circuitry in a first portion of the wireless channel;
identify a plurality of impacted resource units from the plurality of resource units, wherein the plurality of impacted resource units is in the first portion of the wireless channel;
assign the plurality of resource units to the plurality of client devices communicating in accordance with the first wireless protocol, wherein the plurality of impacted resource units is not assigned to client devices for communication; and
transmit a message to a client device,
wherein the source of the transmission of a second wireless protocol signal originates from a legacy device that is configured to halt transmissions in the first portion of the wireless channel in response to detecting that other devices, including an access point, are transmitting signals in the first portion of the wireless channel,
wherein the legacy device detects other devices, including the access point, that are transmitting signals in the first portion of the channel based on a carrier sense threshold of the legacy device, and wherein the control circuitry is further configured to:
adjust a second power level to be less than the carrier sense threshold of the legacy device; and
transmit, from the access point, the message to the client device at the adjusted second power level in the first portion of the wireless channel simultaneous with transmission, from the legacy device, of the second wireless protocol signal in the first portion of the wireless channel,
wherein the wireless channel has a maximum allowed power level and wherein:
the power level of the second wireless protocol signal is less than the maximum allowed power level; and
the second power level of transmissions by the access point in the first portion of the wireless channel plus a power level of transmissions by the access point in portions of the wireless channel other than the first portion is less than the maximum allowed power level,
wherein the carrier sense threshold of the legacy device is greater than or equal to the second power level minus a path loss between the access point and the legacy device, and
wherein a carrier sense threshold of the access point is greater than or equal to a power level of the second wireless protocol signal transmitted by the legacy device minus the path loss between the access point and the legacy device.

13. The system of claim 12, wherein the control circuitry is further configured to increase a power level for transmissions made by an access point when communicating over resource units that are (1) in the plurality of resource units and (2) not in the plurality of impacted resource units.

14. The system of claim 12, wherein the transmission of signals is centered on a different wireless channel that overlaps with the wireless channel, wherein the control circuitry is further configured to:
- determine an overlapping region between the wireless channel and the different wireless channel;
- identify a second plurality of impacted resource units in the overlapping region, wherein the second plurality of impacted resource units is not assigned to client devices for communication.

15. The system of claim 3, of claim 1, further comprising:
- means for determining a difference between a maximum power level for the wireless channel and the second power level;
- means for allocating the difference of the power levels for transmissions over one or more different portions of the wireless channel.

16. The system of claim 3, wherein the legacy device detects other devices, including the access point, that are transmitting signals in the first portion of the wireless channel based on a carrier sense threshold of the legacy device, wherein the system further comprises:
- means for adjusting the second power level to be less than the carrier sense threshold of the legacy device; and
- means for transmitting, from the access point, the message to the client device at the second power level in the first portion of the wireless channel simultaneous with transmission, from the legacy device, of the second wireless protocol signal in the first portion of the wireless channel.

17. A non-transitory computer readable medium having instructions encoded thereon that when executed by control circuitry of an access point cause the control circuitry to:
- assign a first portion of a wireless channel to a client device, wherein communication between the access point and the client device occurs via radio transmission at a first power level and in accordance with a first wireless protocol;
- determine that a transmission of a second wireless protocol signal from a source other than the access point is occurring in the first portion of the wireless channel;
- in response to determining that the transmission of the second wireless protocol signal is occurring in the first portion of the wireless channel, determine a second power level for transmissions to the client device in the first portion of the wireless channel;
- assign the second power level to transmissions when communicating with the client device in the first portion of the wireless channel; and
- transmit a message to the client device at the second power level in the first portion of the wireless channel,
- wherein the source of the transmission of the second wireless protocol signal originates from a legacy device that is configured to halt transmissions in the first portion of the wireless channel in response to detecting that other devices, including the access point, are transmitting signals in the first portion of the wireless channel,
- wherein the legacy device detects other devices, including the access point, that are transmitting signals in the first portion of the channel based on a carrier sense threshold of the legacy device, and wherein the non-transitory computer readable medium has further instructions encoded thereon that when executed by the control circuitry of the access point cause the control circuitry to:
  - adjust the second power level to be less than the carrier sense threshold of the legacy device; and
  - transmit, from the access point, the message to the client device at the adjusted second power level in the first portion of the wireless channel simultaneous with transmission, from the legacy device, of the second wireless protocol signal in the first portion of the wireless channel,
- wherein the source of the transmission of the second wireless protocol signal originates from a legacy device that is configured to halt transmissions in the first portion of the wireless channel in response to detecting that other devices, including the access point, are transmitting signals in the first portion of the wireless channel,
- wherein the wireless channel has a maximum allowed power level and wherein:
  - the power level of the second wireless protocol signal is less than the maximum allowed power level; and
  - the second power level of transmissions by the access point in the first portion of the wireless channel plus a power level of transmissions by the access point in portions of the wireless channel other than the first portion is less than the maximum allowed power level,
- wherein the carrier sense threshold of the legacy device is greater than or equal to the second power level minus a path loss between the access point and the legacy device, and
- wherein a carrier sense threshold of the access point is greater than or equal to a power level of the second wireless protocol signal transmitted by the legacy device minus the path loss between the access point and the legacy device.

18. The non-transitory computer readable medium of claim 17, wherein the legacy device detects other devices, including the access point, that are transmitting signals based on a carrier sense threshold of the legacy device, and wherein the non-transitory computer readable medium further comprises instructions encoded thereon that when executed by the control circuitry cause the control circuitry to:
- adjust the second power level to be less than the carrier sense threshold of the legacy device; and
- transmit, from the access point, the message to the client device at the second power level in the first portion of the wireless channel simultaneous with transmission, from the legacy device, of the second wireless protocol signal in the first portion of the wireless channel.

19. The non-transitory computer readable medium of claim 17, further comprising instructions encoded thereon that when executed by the control circuitry cause the control circuitry to:
- determine a difference between a maximum power level for the wireless channel and the second power level;
- allocate the difference of the power levels for transmissions over one or more different portions of the wireless channel.

20. A non-transitory computer readable medium having instructions encoded thereon that when executed by control circuitry of an electronic device cause the control circuitry to:
- allocate a wireless channel for communication in accordance with a first wireless protocol, wherein the wireless channel comprises a plurality of resource units defined for assignment to a plurality of client devices communicating in accordance with the first wireless protocol;

determine that a transmission of signals is occurring by a source different than the electronic device in a first portion of the wireless channel;

identify a plurality of impacted resource units from the plurality of resource units, wherein the plurality of impacted resource units is in the first portion of the wireless channel;

generate a resource unit schedule that assigns the plurality of resource units to the plurality of client devices communicating in accordance with the first wireless protocol, wherein the plurality of impacted resource units is not assigned to client devices for communication; and transmit a message to a client device based on the resource unit schedule, wherein the source of the transmission of a second wireless protocol signal originates from a legacy device that is configured to halt transmissions in the first portion of the wireless channel in response to detecting that other devices, including an access point, are transmitting signals in the first portion of the wireless channel, wherein the legacy device detects other devices, including the access point, that are transmitting signals in the first portion of the channel based on a carrier sense threshold of the legacy device, and wherein the non-transitory computer readable medium has further instructions encoded thereon that when executed by the control circuitry of the access point cause the control circuitry to:

adjust a second power level to be less than the carrier sense threshold of the legacy device; and transmit, from the access point, the message to the client device at the adjusted second power level in the first portion of the wireless channel simultaneous with transmission, from the legacy device, of the second wireless protocol signal in the first portion of the wireless channel, wherein the wireless channel has a maximum allowed power level and wherein:

the power level of the second wireless protocol signal is less than the maximum allowed power level; and the second power level of transmissions by the access point in the first portion of the wireless channel plus a power level of transmissions by the access point in portions of the wireless channel other than the first portion is less than the maximum allowed power level, wherein the carrier sense threshold of the legacy device is greater than or equal to the second power level minus a path loss between the access point and the legacy device, and wherein a carrier sense threshold of the access point is greater than or equal to a power level of the second wireless protocol signal transmitted by the legacy device minus the path loss between the access point and the legacy device.

21. The non-transitory computer readable medium of claim 20, further comprising instructions encoded thereon that when executed by the control circuitry cause the control circuitry to increase a power level for transmissions when communicating over resource units that are (1) in the plurality of resource units and (2) not in the plurality of impacted resource units.

22. The non-transitory computer readable medium of claim 20, wherein the transmission of signals is centered on a different wireless channel that overlaps with the wireless channel, further comprising instructions encoded thereon that when executed by the control circuitry cause the control circuitry to:

determine an overlapping region between the wireless channel and the different wireless channel;

identify a second plurality of impacted resource units in the overlapping region; and generate the resource unit schedule wherein the second plurality of impacted resource units is not assigned to client devices for communication.

23. A method for adjusting transmission power of devices communicating on portions of a wireless channel, the method comprising:

assigning to each of a plurality of client devices a respective portion of the wireless channel;

transmitting to each of the plurality of client devices over the respective portion of the wireless channel a corresponding wireless signal, each corresponding wireless signal having a first power level;

determining a power level of a received wireless signal at each of the plurality of client devices in response to the corresponding transmitted wireless signal having the first power level; and adjusting a transmission power of the corresponding wireless signal being transmitted over each portion of the wireless channel to substantially equalize the power levels of the received wireless signals at the plurality of client devices, wherein a source of transmission of a second wireless protocol signal originates from a legacy device that is configured to halt transmissions in the first portion of the wireless channel in response to detecting that other devices, including an access point, are transmitting signals in the first portion of the wireless channel, wherein the legacy device detects other devices, including the access point, that are transmitting signals in the first portion of the channel based on a carrier sense threshold of the legacy device, and wherein the method further comprises:

adjusting the second power level to be less than the carrier sense threshold of the legacy device; and transmitting, from the access point, a message to the client device at the adjusted second power level in the first portion of the wireless channel simultaneous with transmission, from the legacy device, of the second wireless protocol signal in the first portion of the wireless channel, wherein the wireless channel has a maximum allowed power level and wherein:

the power level of the second wireless protocol signal is less than the maximum allowed power level; and the second power level of transmissions by the access point in the first portion of the wireless channel plus a power level of transmissions by the access point in portions of the wireless channel other than the first portion is less than the maximum allowed power level, wherein the carrier sense threshold of the legacy device is greater than or equal to the second power level minus a path loss between the access point and the legacy device, and wherein a carrier sense threshold of the access point is greater than or equal to a power level of the second wireless protocol signal transmitted by the legacy device minus the path loss between the access point and the legacy device.

24. The method of claim 23, wherein a sum of the transmission powers of the corresponding wireless signals being transmitted over all the assigned portions of the wireless channel is less than a total transmission power allotted for all portions of the wireless channel.

25. The method of claim 24, wherein the transmission power of the corresponding wireless signal being transmitted over each assigned portion of the wireless channel is less than a maximum transmission power allotted for each portion of the wireless channel.

* * * * *